US009730179B2

(12) United States Patent
Aldana et al.

(10) Patent No.: US 9,730,179 B2
(45) Date of Patent: Aug. 8, 2017

(54) PASSIVE LOCATIONING OVER MULTIPLE CHANNELS

(71) Applicant: QUALCOMM Incorporated, San Diego, CA (US)

(72) Inventors: Carlos Horacio Aldana, Mountain View, CA (US); Xiaoxin Zhang, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/938,738

(22) Filed: Nov. 11, 2015

(65) Prior Publication Data

US 2016/0150499 A1    May 26, 2016

Related U.S. Application Data

(60) Provisional application No. 62/082,502, filed on Nov. 20, 2014.

(51) Int. Cl.
| | |
|---|---|
| *H04W 24/00* | (2009.01) |
| *H04W 64/00* | (2009.01) |
| *H04L 5/00* | (2006.01) |
| *H04W 4/02* | (2009.01) |
| *H04W 24/10* | (2009.01) |
| *G01S 5/02* | (2010.01) |
| *G01S 11/02* | (2010.01) |
| *H04W 84/12* | (2009.01) |

(52) U.S. Cl.
CPC ........... *H04W 64/00* (2013.01); *G01S 5/0236* (2013.01); *G01S 11/02* (2013.01); *H04L 5/0055* (2013.01); *H04W 4/02* (2013.01); *H04W 24/10* (2013.01); *H04W 84/12* (2013.01)

(58) Field of Classification Search
CPC ......... H04W 4/02; H04W 4/06; H04W 64/00; H04W 64/003; H04W 84/12
USPC ....................................... 455/456.2
See application file for complete search history.

(56) References Cited

U.S. PATENT DOCUMENTS

| | | | |
|---|---|---|---|
| 2012/0134282 A1* | 5/2012 | Tirronen ............... | H04W 4/005 370/252 |
| 2012/0315919 A1* | 12/2012 | Hirsch ................. | G01S 13/767 455/456.1 |

(Continued)

OTHER PUBLICATIONS

International Search Report and Written Opinion—PCT/US2015/060324—ISA/EPO—Feb. 26, 2016.

(Continued)

*Primary Examiner* — Timothy Pham
(74) *Attorney, Agent, or Firm* — Paradice and Li LLP

(57) ABSTRACT

Apparatuses and methods for performing multi-channel passive ranging operations are disclosed. In one example, a passive listening device may receive, on a first wireless channel, a first exchange of signals between a first wireless device and a second wireless device, and then receive on a second wireless channel, a second exchange of signals between the first wireless device and the second wireless device, the first wireless channel different than the second wireless channel. The passive listening device may determine a differential distance between the passive listening device and the first and second wireless devices based, at least in part, on the first and second exchanges of signals on the first and second wireless channels, respectively.

26 Claims, 10 Drawing Sheets

(56) References Cited

U.S. PATENT DOCUMENTS

2014/0295877 A1 10/2014 Hart
2015/0098460 A1* 4/2015 Wang .................... H04W 4/08
                                                    370/338

OTHER PUBLICATIONS

Kakami N., et al., "CIDs 1424, 1671, 1418 Regarding Fine Timing Measurement," Sep. 17, 2013 (Sep. 17, 2013), pp. 1-4, XP002754197, Retrieved from the Internet: URL:https://mentor.ieee.org/802.11/dcn/13/11-13-1178-00-000m-resolution-for-draft-1-0-lb-cid-s-cids-1424-1671-1418.docx [retrieved on Feb. 12, 2016].

* cited by examiner

PASSIVE LOCATIONING OVER MULTIPLE CHANNELS

CROSS-REFERENCE TO RELATED APPLICATION

This application claims priority to commonly-owned U.S. Provisional Patent Application No. 62/082,502, titled "Passive Locationing over Multiple Channels," filed Nov. 20, 2014, which is hereby incorporated by reference in its entirety.

TECHNICAL FIELD

The example embodiments relate generally to wireless networks, and specifically to ranging operations performed between wireless devices.

BACKGROUND OF RELATED ART

The recent proliferation of Wi-Fi access points in wireless local area networks (WLANs) has made it possible for navigation systems to use these access points for position determination, especially in areas where there are a large concentration of active Wi-Fi access points (e.g., urban cores, shopping centers, office buildings, and so on). For example, a client device or station (STA) such as a cell phone or tablet computer can use the round trip time (RTT) of signals transmitted to and from the access points (APs) to determine the distances between the STA and the APs. Once the distances between the STA and three APs are determined, the location of the STA may be estimated using trilateration techniques.

More generally, the distance between a first device and a second device may be determined using the RTT of signals exchanged between the first and second devices. A third device may passively listen to the signals exchanged between the first and second devices, and determine distances between itself and each of the first and second devices based on the signals exchanged between the first and second devices. Because ranging operations are becoming more important for determining positions of wireless devices, it is desirable to increase the accuracy of ranging operations.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the disclosure are directed to apparatuses and methods for performing multi-channel passive ranging operations. In one example, a method for performing a multi-channel passive ranging operation is disclosed. The method may include receiving, on a first wireless channel, a first exchange of signals between a first wireless device and a second wireless device; receiving, on a second wireless channel, a second exchange of signals between the first wireless device and the second wireless device, the first wireless channel different than the second wireless channel; and determining a differential distance between the passive listening device and the first and second wireless devices based, at least in part, on the first and second exchanges of signals on the first and second wireless channels, respectively.

In another example, an apparatus for performing a multi-channel passive ranging operation is disclosed. The apparatus may include means for receiving, on a first wireless channel, a first exchange of signals between a first wireless device and a second wireless device; means for receiving, on a second wireless channel, a second exchange of signals between the first wireless device and the second wireless device, the first wireless channel different than the second wireless channel; and means for determining a differential distance between the passive listening device and the first and second wireless devices based, at least in part, on the first and second exchanges of signals on the first and second wireless channels, respectively.

In another example, an apparatus for performing a multi-channel passive ranging operation is disclosed. The apparatus may include one or more processors and a memory configured to store instructions. Execution of the instructions by the one or more processors may cause the passive listening device to receive, on a first wireless channel, a first exchange of signals between a first wireless device and a second wireless device; receive, on a second wireless channel, a second exchange of signals between the first wireless device and the second wireless device, the first wireless channel different than the second wireless channel; and determine a differential distance between the passive listening device and the first and second wireless devices based, at least in part, on the first and second exchanges of signals on the first and second wireless channels, respectively.

In another example, a non-transitory computer-readable storage medium is disclosed. The non-transitory computer-readable storage medium may store instructions that, when executed by one or more processors of a passive listening device, may cause the passive listening device to perform a multi-channel passive ranging operation by performing operations including receiving, on a first wireless channel, a first exchange of signals between a first wireless device and a second wireless device; receiving, on a second wireless channel, a second exchange of signals between the first wireless device and the second wireless device, the first wireless channel different than the second wireless channel; and determining a differential distance between the passive listening device and the first and second wireless devices based, at least in part, on the first and second exchanges of signals on the first and second wireless channels, respectively.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

Figure 1A:
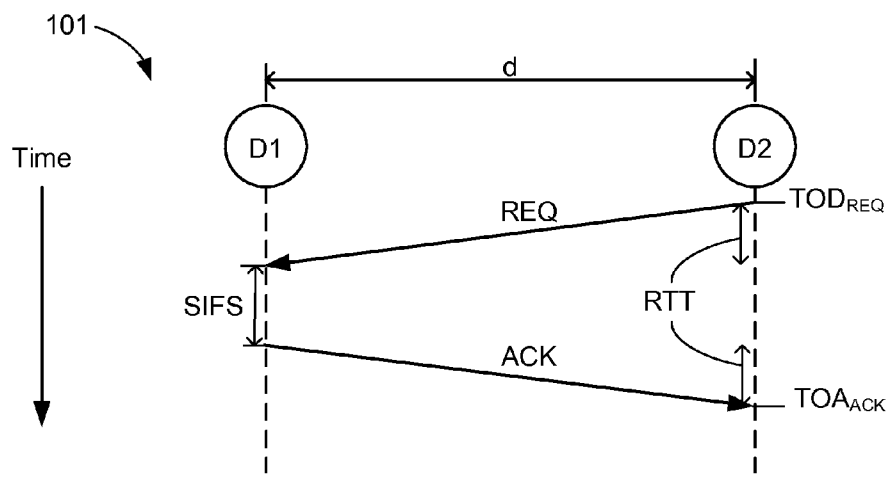
FIG. 1A is a sequence diagram depicting an example ranging operation.

The example embodiments are described below in the context of ranging operations performed by and between Wi-Fi enabled devices for simplicity only. It is to be understood that the example embodiments are equally applicable for performing ranging operations using signals of other various wireless standards or protocols, and for performing ranging operations between various devices (e.g., between a STA and a wireless AP, between APs, and so on). As used herein, the terms WLAN and Wi-Fi can include communications governed by the IEEE 802.11 standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scopes all embodiments defined by the appended claims.

As mentioned above, the distance between a pair of devices may be determined using the RTT of signals exchanged between the devices. For example, FIG. 1A shows a sequence diagram of an example ranging operation 101 that may be used to determine the distance between a first device D1 and a second device D2. More specifically, the distance (d) between device D1 and device D2 may be expressed as d=c*RTT/2, where c is the speed of light, and RTT is the summation of the actual signal propagation times of a request (REQ) frame and an acknowledgement (ACK) frame exchanged between devices D1 and D2. More specifically, device D2 may determine the RTT value using the time of departure (TOD) of the REQ frame from device D2, the time of arrival (TOA) of the ACK frame received by device D2, and the SIFS duration of device D1. The SIFS duration, which stands for the short interframe space duration, indicates the duration of time between device D1 receiving the REQ frame and transmitting the ACK frame. The SIFS duration, a range of values for which are provided by the IEEE 802.11 standards, may allow a wireless device time to switch its transceivers from a receive mode (e.g., to receive the REQ frame) to a transmit mode (e.g., to transmit the ACK frame).

Because different make-and-models (and sometimes even same make-and-models) of devices have different processing delays, the precise value of SIFS may vary between devices (and even between successive frame receptions/transmissions in the same device). As a result, the value of SIFS for a device involved in an RTT-based ranging operation is typically estimated, which often leads to errors in determining the distance between two devices. More specifically, the IEEE 802.11 standards define the SIFS duration as 10 μs+/−900 ns at 2.4 GHz, 16 μs+/−900 ns at 5 GHz, and 3 μs+/−900 ns at 60 GHz. These "standard" SIFS durations include tolerances that may decrease the accuracy of RTT estimates. For example, even if the SIFS duration of device D1 may be estimated within +/−25 ns, a ranging error of +/−7.5 meters may result (which may be unacceptable for indoor positioning systems).

Figure 1B:
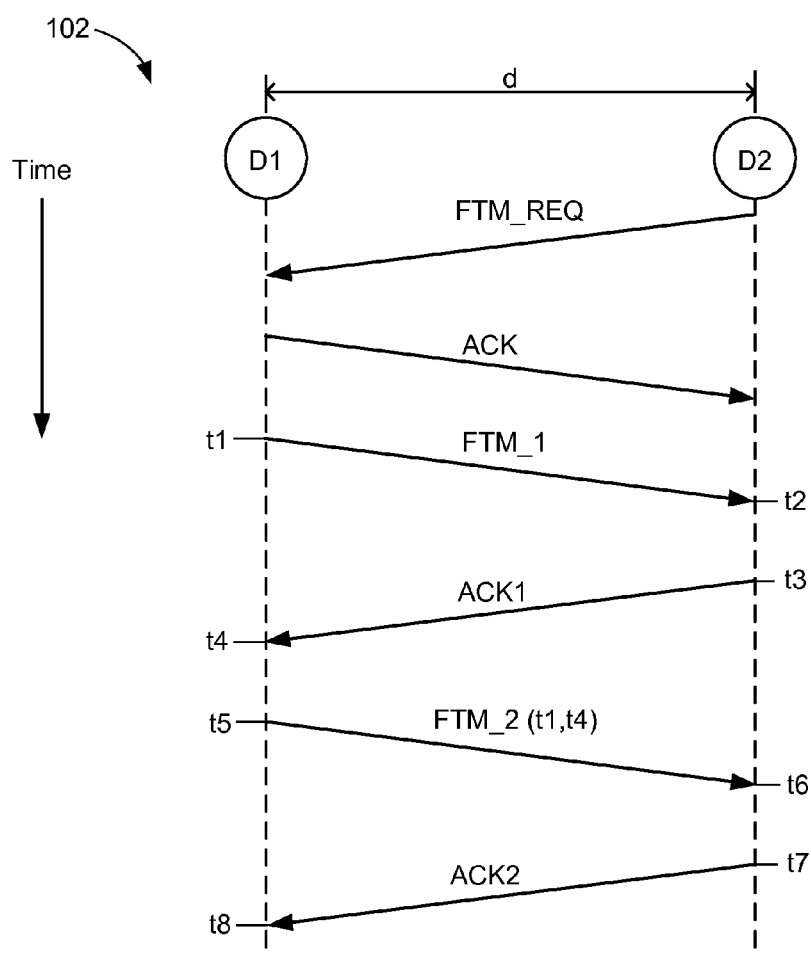
FIG. 1B is a sequence diagram depicting another example ranging operation.

To reduce ranging errors resulting from uncertainties in the SIFS value of a given device, recent revisions to the IEEE 802.11 standards call for each device involved in a ranging operation to capture timestamps of incoming and outgoing frames so that the value of RTT may be determined without using SIFS values. For example, FIG. 1B shows a sequence diagram depicting an example ranging operation 102 between device D1 and device D2 performed using Fine Timing Measurement (FTM) frames in accordance with the IEEE 802.11REVmc standards. For the example of FIG. 1B, device D2 initiates the ranging operation by sending a ranging request to device D1, and device D1 responds to the request. Thus, device D2 may be referred to herein as the initiator device, and device D1 may be referred to herein as the responder device.

More specifically, device D2 may request a ranging operation by transmitting an FTM request (FTM_REQ) frame to device D1, which responds by transmitting an ACK frame to device D2. The exchange of the FTM_REQ frame and the ACK frame is a handshake process that not only indicates intent to perform a ranging operation but also allows the devices D1 and D2 to determine whether each other supports capturing timestamps. Assuming that both device D1 and device D2 support capturing timestamps, device D1 may transmit a first FTM frame (FTM_1) to device D2, and may capture the TOD of FTM_1 as time t1. Device D2 receives FTM_1 at time t2, and captures the TOA of FTM_1 as time t2. Device D2 acknowledges receipt of FTM_1 by transmitting a first ACK frame (ACK1) at time t3, and captures the TOD of ACK1 as time t3. Device D1 receives ACK1 at time t4, and captures the TOA of ACK1 as time t4. At time t5, device D1 transmits (to device D2) a second FTM frame (FTM_2) that includes the timestamps captured at times t1 and t4 (e.g., the TOD of FTM_1 and the TOA of ACK1). Device D2 receives the FTM_2 frame at time t6, and may capture the TOA of FTM_2 as time t6. Device D2 may acknowledge receipt of FTM_2 by transmitting a second ACK frame (ACK2) at time t7. Device D1 receives ACK2 at time t8.

Upon receiving FTM_2 at time t6, device D2 has timestamp values for times t1, t2, t3, and t4 that correspond to the TOD of FTM_1 from device D1, the TOA of FTM_1 at device D2, the TOD of the ACK frame from device D2, and the TOA of the ACK frame at device D1, respectively. Thereafter, device D2 may determine the RTT value as (t4−t3)+(t2−t1). Because the determined RTT value does not involve estimating SIFS for either device D1 or device D2, the determined RTT value does not involve errors resulting from uncertainties of SIFS durations. As a result, the ranging operation 102 depicted in FIG. 1B may provide more accurate RTT values (and thus more accurate distance determinations) than the ranging operation 101 depicted in FIG. 1A.

More recent revisions to the IEEE 802.11 standards allow a selected device to passively listen to FTM frame exchanges during a ranging operation between a pair of other devices, and then use timing information of the FTM frames to determine relative distances between itself and each of the other devices. More specifically, the selected device may capture TOA information of the FTM frames received at the selected device and use the TOA information, along with the timestamps embedded in one or more of the FTM frames exchanged between the pair of other devices, to determine a differential distance between the selected device and each of the other devices. Once differential distances between the first device and three or more pairs of other devices are determined, the selected device may use well-known hyperbolic navigation techniques to determine its location relative to the other devices.

For purposes of discussion herein, the selected device may hereinafter be referred to as the "passive listening device," and the other devices may hereinafter be referred to as the "active ranging devices."

Figure 2:
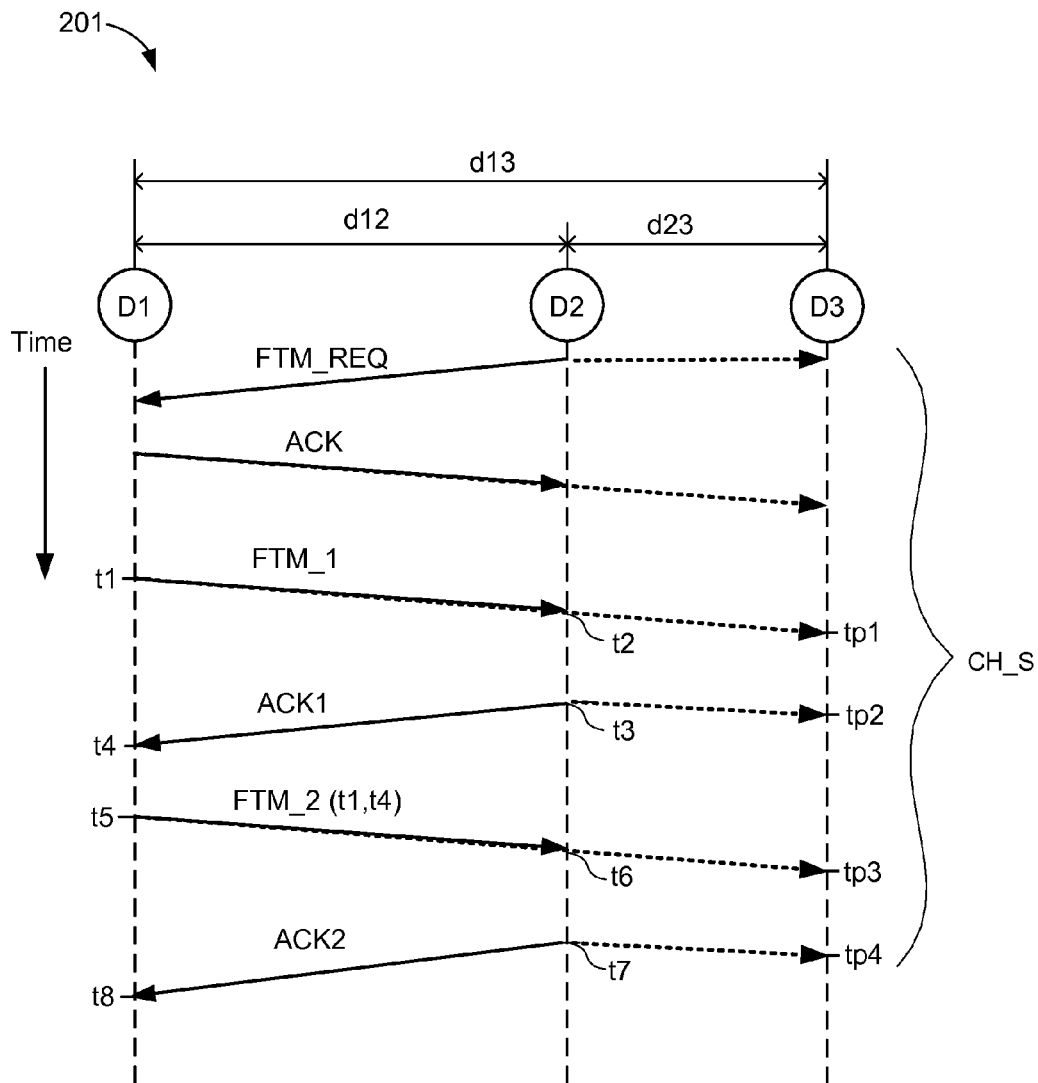
FIG. 2 is a sequence diagram depicting an example passive ranging operation.

FIG. 2 depicts an example passive ranging operation 201 that may be performed by listening to FTM frame exchanges between a pair of active ranging devices over a single wireless channel (CH_S). For the example of FIG. 2, devices D1 and D2 are active ranging devices, and device D3 is a passive listening device. Further, device D2 is depicted as requesting the active ranging operation, and thus device D2 is the initiator device and device D1 is the responder device. As shown in FIG. 2, the distance between device D1 and device D2 is denoted as "d12," the distance between device D1 and device D3 is denoted as "d13," and the distance between device D2 and device D3 is denoted as "d23."

Device D2 requests the ranging operation with device D1 by transmitting an FTM_REQ frame to device D1, which responds by transmitting an ACK frame to device D2. At time t1, device D1 transmits a first FTM frame (FTM_1) to device D2, and captures the TOD of FTM_1 as time t1. In response thereto, device D2 transmits a first ACK frame (ACK1) at time t3, and captures the TOD of ACK1 as time t3. Device D1 receives ACK1 at time t4, and captures the TOA of ACK1 as time t4. At time t5, device D1 transmits a second FTM frame (FTM_2) that includes the timestamps captured at times t1 and t4 (e.g., the TOD of FTM_1 and the TOA of the ACK1 frame). Device D2 receives the FTM_2 frame at time t6, and may capture the TOA of FTM_2 as time t6. At time t7, device D2 transmits a second ACK frame (ACK2), which is received by device D1 at time t8.

As a passive listening device, device D3 may receive all of the frames exchanged during the active ranging operation between device D1 and device D2. For example, device D3 may receive FTM_1 at time tp1, may receive ACK1 at time tp2, may receive FTM_2 at time tp3, and may receive ACK2 at time tp4. Device D3 may extract the timestamps t1 and t4 (e.g., indicating the TOD of FTM_1 from device D1 and the TOA of ACK1 at device D1) from FTM_2. Device D3 may then use times tp1, tp2, t1, and t4 to determine a differential distance between itself and devices D1 and D2. Thereafter, device D3 may use well-known hyperbolic navigation techniques to determine its location based on differential distances between itself and three or more pairs of active ranging devices. Because device D3 does not transmit any frames during the passive ranging operations, device D3 may determine its location using less power, for example, compared with active ranging devices such as devices D1 and D2.

The timing accuracy of ranging operations such as the passive ranging operation 201 of FIG. 2 may be proportional to the frequency bandwidth used to transmit the FTM and ACK frames between the ranging devices. More specifically, transmitting FTM frames using a relatively large bandwidth may achieve more accurate RTT value than transmitting FTM frames using a relatively small bandwidth. For example, while IEEE 801.11n-based wireless networks typically use 40 MHz-wide channels, IEEE 801.11ac-based wireless networks may use channels having bandwidths of 80 MHz or 160 MHz. However, FTM frames transmitted using a relatively large bandwidth typically have a lower signal-to-noise ratio (SNR) and shorter range than FTM frames transmitted using a relatively small bandwidth. Thus, one of the technical problems to be solved by the example embodiments is to maximize the frequency bandwidth used to transmit FTM frames during ranging operations without degrading their SNR and/or limiting their range (e.g., effective distance).

As described in more detail below, methods and apparatuses are disclosed that may increase the frequency bandwidth with which FTM frames are exchanged during passive ranging operations by performing a plurality of FTM frame exchanges over a number of different wireless channels each occupying a different range of frequencies. One or more suitable channel concatenation techniques (such as channel stitching) may then be employed to effectively combine or "stitch" together the number of different wireless channels. In this manner, the passive ranging operation may be performed over a wider frequency bandwidth (e.g., as compared with the single-channel passive ranging operation of FIG. 2) without sacrificing the SNR or range of the exchanged FTM frames. These are some of the technical solutions that the example embodiments may provide to the aforementioned technical problems.

Figure 3:
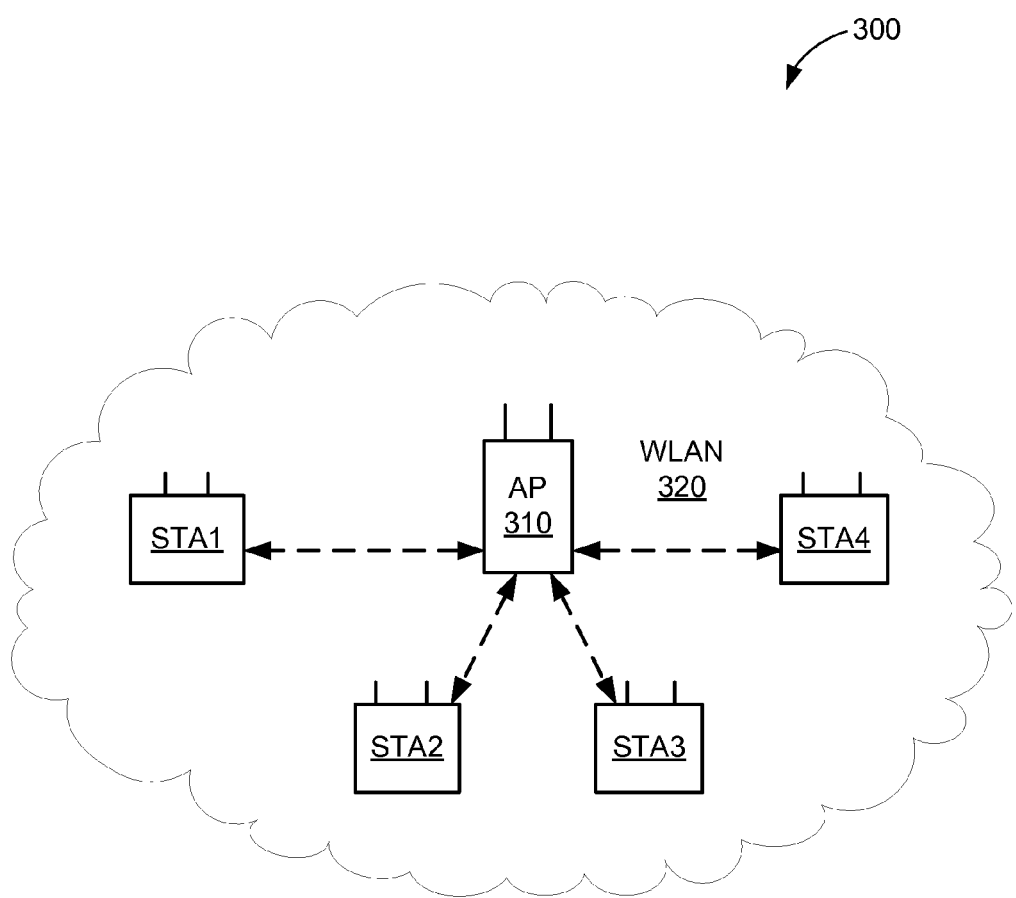
FIG. 3 is a block diagram of a wireless network within which the example embodiments may be implemented.

FIG. 3 is a block diagram of a wireless network 300 within which the example embodiments may be implemented. The wireless network 300 is shown to include four wireless stations STA1-STA4, a wireless access point (AP) 310, and a wireless local area network (WLAN) 320. The WLAN 320 may be formed by a plurality of Wi-Fi access points (APs) that may operate according to the IEEE 802.11 family of standards (or according to other suitable wireless protocols). Thus, although only one AP 310 is shown in FIG. 3 for simplicity, it is to be understood that WLAN 320 may be formed by any number of access points such as AP 310. The AP 310 is assigned a unique MAC address that is programmed therein by, for example, the manufacturer of the access point. Similarly, each of STA1-STA4 is also assigned a unique MAC address. For some embodiments, the wireless system 300 may correspond to a multiple-input multiple-output (MIMO) wireless network. Further, although the WLAN 320 is depicted in FIG. 3 as an infrastructure BSS, for other example embodiments, WLAN 320 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each station STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each station STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 6, 8, and 9.

The AP 310 may be any suitable device that allows one or more wireless devices to connect to a network (e.g., a local area network (LAN), wide area network (WAN), metropolitan area network (MAN), and/or the Internet) via AP 310 using Wi-Fi, Bluetooth, or any other suitable wireless communication standards. For at least one embodiment, AP 310 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 6, 8, and 9.

For the stations STA1-STA4 and/or AP 310, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the STA may be any technically feasible transceiver such as a ZigBee transceiver described by a specification from the ZigBee specification, a WiGig transceiver, and/or a HomePlug transceiver described a specification from the HomePlug Alliance.

AP 310, which may correspond to a Basic Service Set (BSS), may periodically broadcast beacon frames to enable any STAs within wireless range of the AP 310 to establish and/or maintain a communication link with the Wi-Fi network. The bacon frames, which may include a traffic indication map (TIM) indicating whether the AP 310 has queued downlink data for the stations STA1-STA4, are typically broadcast according to a target beacon transmission time (TBTT) schedule. The broadcasted beacon frames may also include the AP's timing synchronization function (TSF) value. The stations STA1-STA4 may synchronize their own local TSF values with the broadcasted TSF value, for example, so that all the stations STA1-STA4 are synchronized with each other and the AP 310.

Figure 4:
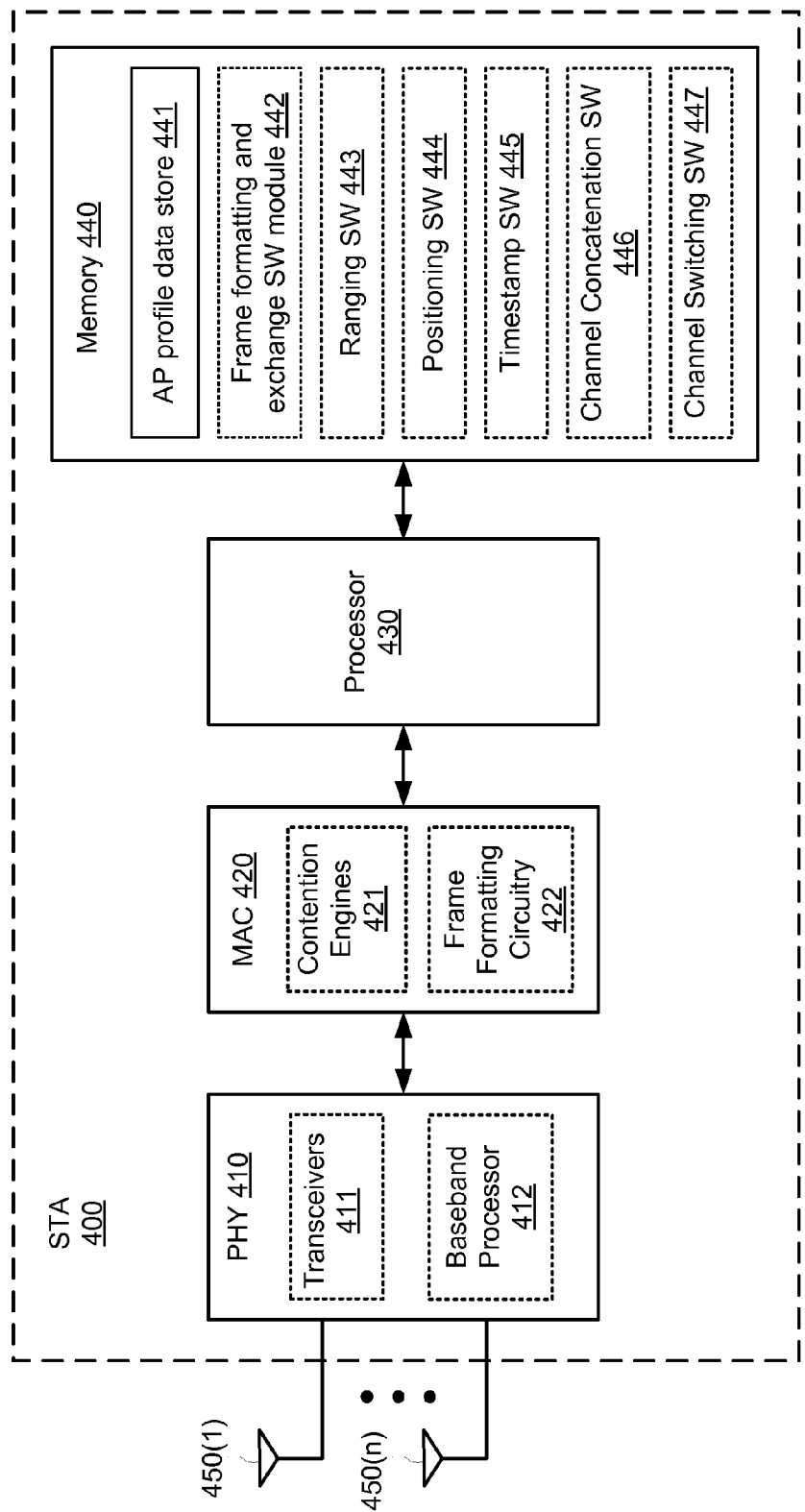
FIG. 4 is a block diagram of a wireless station (STA) in accordance with example embodiments.

FIG. 4 shows an example STA 400 that may be one embodiment of one or more of the stations STA1-STA4 of FIG. 3. The STA 400 may include a PHY device 410 including at least a number of transceivers 411 and a baseband processor 412, may include a MAC 420 including at least a number of contention engines 421 and frame formatting circuitry 422, may include a processor 430, may include a memory 440, and may include a number of antennas 450(1)-450(n). The transceivers 411 may be coupled to antennas 450(1)-450(n), either directly or through an antenna selection circuit (not shown for simplicity). The transceivers 411 may be used to transmit signals to and receive signals from AP 310 and/or other STAs (see also FIG. 3), and may be used to scan the surrounding environment to detect and identify nearby access points and/or other STAs (e.g., within wireless range of STA 400). Although not shown in FIG. 4 for simplicity, the transceivers 411 may include any number of transmit chains to process and transmit signals to other wireless devices via antennas 450(1)-450(n), and may include any number of receive chains to process signals received from antennas 450(1)-450(n). Thus, for example embodiments, the STA 400 may be configured for multiple-input, multiple-output (MIMO) operations. The MIMO operations may include single-user MIMO (SU-MIMO) operations and multi-user MIMO (MU-MIMO) operations.

The baseband processor 412 may be used to process signals received from processor 430 and/or memory 440 and to forward the processed signals to transceivers 411 for transmission via one or more of antennas 450(1)-450(n), and may be used to process signals received from one or more of antennas 450(1)-450(n) via transceivers 411 and to forward the processed signals to processor 430 and/or memory 440.

For purposes of discussion herein, MAC 420 is shown in FIG. 4 as being coupled between PHY device 410 and processor 430. For actual embodiments, PHY device 410, MAC 420, processor 430, and/or memory 440 may be connected together using one or more buses (not shown for simplicity).

The contention engines 421 may contend for access to one more shared wireless mediums, and may also store packets for transmission over one more shared wireless mediums. The STA 400 may include one or more contention engines 421 for each of a plurality of different access categories. For other embodiments, the contention engines 421 may be separate from MAC 420. For still other embodiments, the contention engines 421 may be implemented as one or more software modules (e.g., stored in memory 440 or stored in memory provided within MAC 420) containing instructions that, when executed by processor 430, perform the functions of contention engines 421.

The frame formatting circuitry 422 may be used to create and/or format frames received from processor 430 and/or memory 440 (e.g., by adding MAC headers to PDUs provided by processor 430), and may be used to re-format frames received from PHY device 410 (e.g., by stripping MAC headers from frames received from PHY device 410).

Memory 440 may include an AP profile data store 441 that stores profile information for a plurality of APs. The profile information for a particular AP may include information including, for example, the AP's SSID, MAC address, channel information, RSSI values, goodput values, channel state information (CSI), supported data rates, connection history with the AP, a trustworthiness value of the AP (e.g., indicating a level of confidence about the AP's location, etc.), and any other suitable information pertaining to or describing the operation of the AP.

Figure 6:
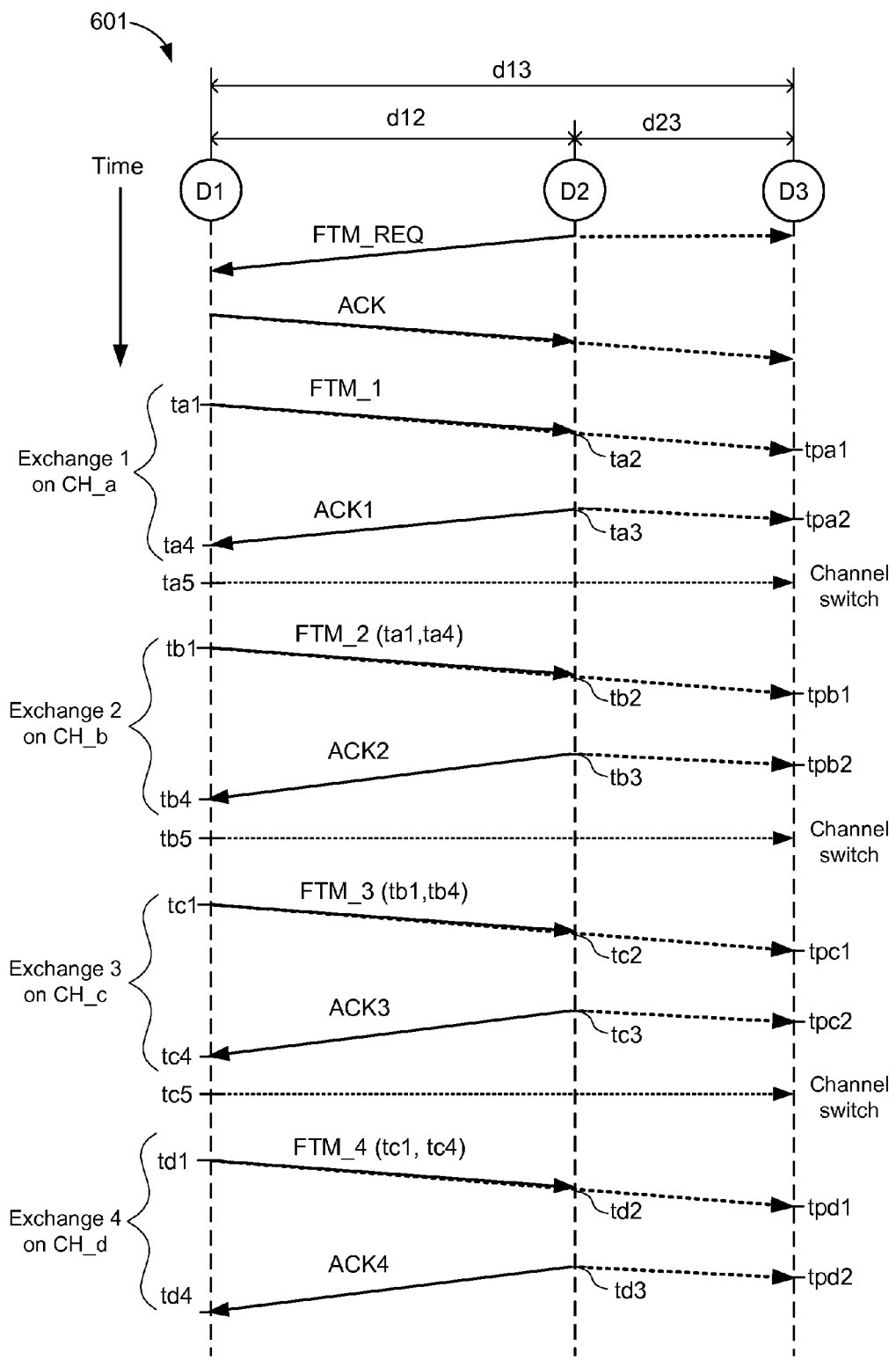
FIG. 6 is a sequence diagram depicting an example multi-channel passive ranging operation in accordance with example embodiments.
Figure 8:
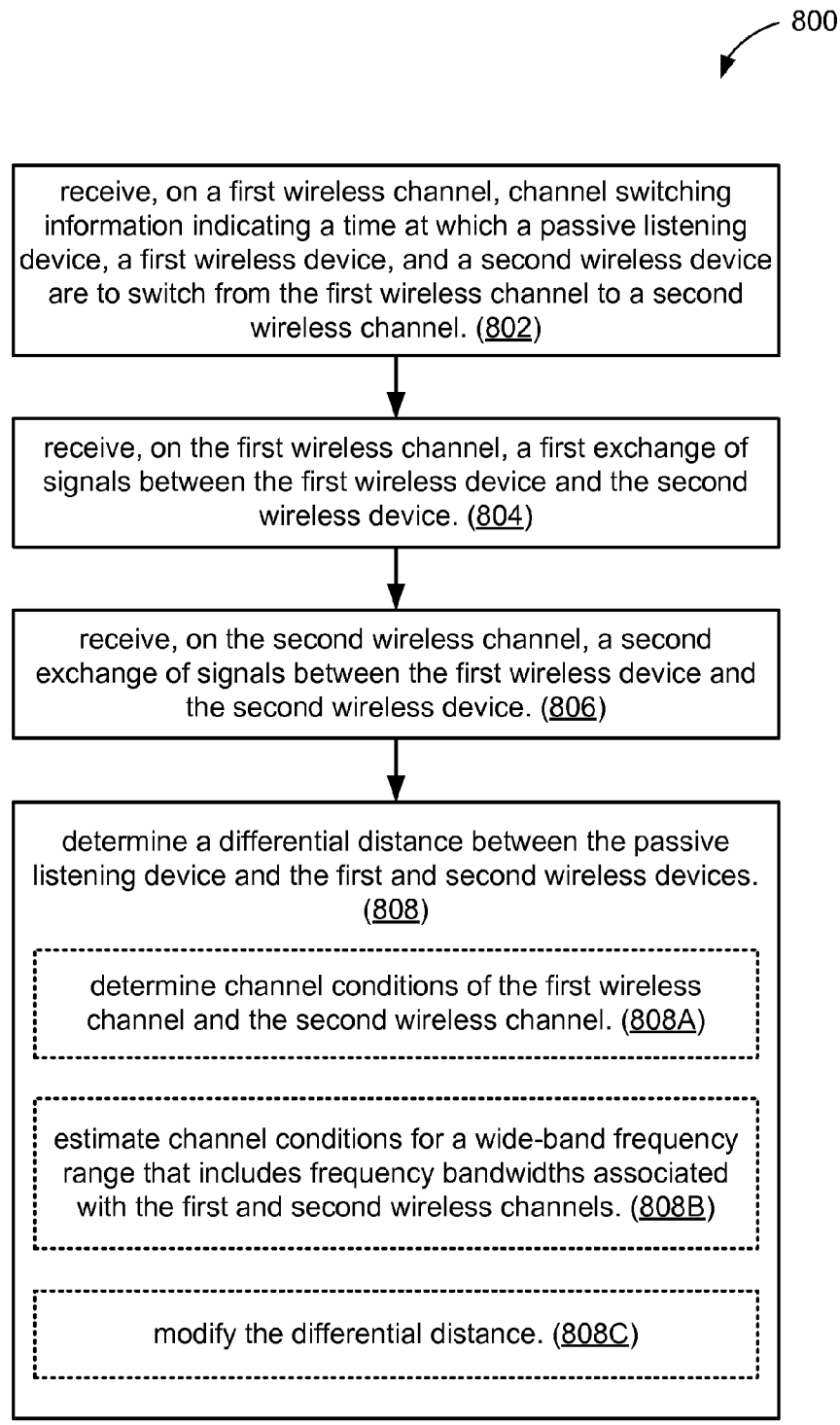
FIG. 8 shows an illustrative flowchart depicting the passive ranging operation of FIG. 6 in accordance with example embodiments.

Memory 440 may also include a non-transitory computer-readable medium (e.g., one or more nonvolatile memory elements, such as EPROM, EEPROM, Flash memory, a hard drive, and so on) that may store at least the following software (SW) modules:

- a frame formatting and exchange software module 442 to facilitate the creation and exchange of any suitable frames (e.g., data frames, control frame, and management frames) between STA 400 and other wireless devices (e.g., as described for one or more operations of FIGS. 6, 8, and 9);
- a ranging SW module 443 to determine RTT values, the distance between the STA 400 and one or more other devices, and/or a differential distance between the STA 400 and a pair of other ranging devices (e.g., as described herein for one or more operations of FIGS. 6, 8, and 9);
- a positioning SW module 444 to determine the location of the STA 400 based on the distances (or differential distances) determined by the ranging module 443 and/or based on the locations of other wireless devices (e.g., as described herein for one or more operations of FIGS. 6, 8, and 9);
- a timestamp SW module 445 to capture timestamps (e.g., TOA and/or TOD information) of frames received by STA 400 (e.g., as described herein for one or more operations of FIGS. 6, 8, and 9);
- a channel concatenation SW module 446 to combine or stitch together channel information from a number of different wireless channels to generate a wider bandwidth channel estimation (e.g., as described herein for one or more operations of FIGS. 6, 8, and 9); and
- a channel scheduling SW module 447 to coordinate channel selection and/or switching operations with a number of other ranging devices (e.g., as described herein for one or more operations of FIGS. 6 and 8).

Each software module includes instructions that, when executed by processor 430, cause STA 400 to perform the corresponding functions. The non-transitory computer-readable medium of memory 440 thus includes instructions for performing all or a portion of the operations depicted in FIGS. 6, 8, and 9.

Processor 430 may be any suitable one or more processors capable of executing scripts or instructions of one or more software programs stored in STA 400 (e.g., within memory 440). For example, processor 430 may execute the frame formatting and exchange software module 442 to facilitate the creation and exchange of any suitable frames (e.g., data frames, control frame, and management frames) between STA 400 and other wireless devices. Processor 430 may execute the ranging SW module 443 to determine RTT values, the distance between the STA 400 and one or more other devices, and/or a differential distance between the STA 400 and a pair of other ranging devices. Processor 430 may execute the positioning SW module 444 to determine the location of the STA 400 based on the distances (or differential distances) determined by the ranging module 443 and/or based on the locations of other wireless devices. Processor 430 may execute the timestamp SW module 445 to capture timestamps (e.g., TOA and/or TOD information) of frames received by STA 400. Processor 430 may execute the channel concatenation SW module 446 to combine or stitch together channel information from a number of different wireless channels to generate a wider bandwidth channel estimation. Processor 430 may execute the channel scheduling SW module 447 to coordinate channel selection and/or switching operations with a number of other ranging devices.

Figure 5:
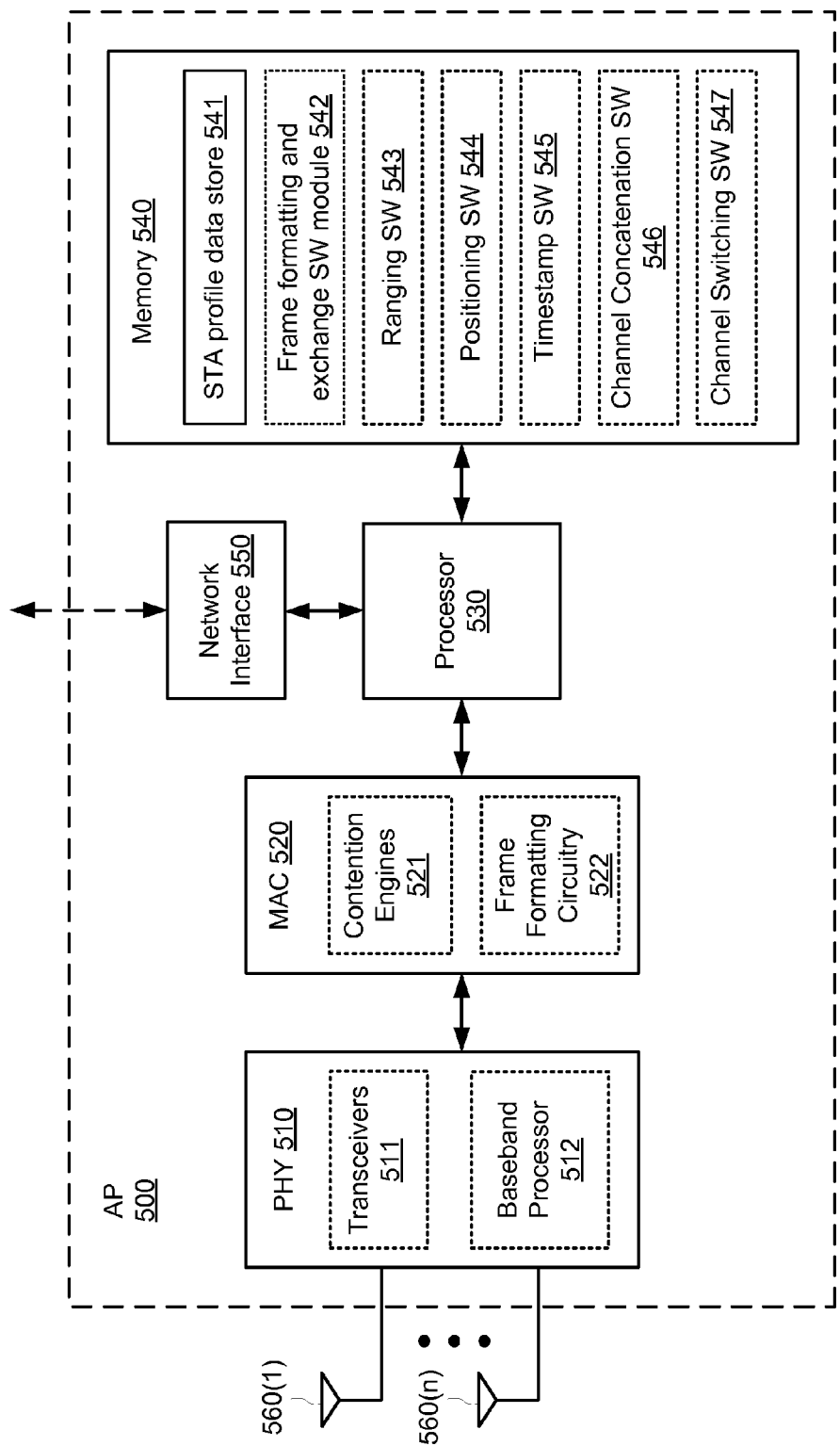
FIG. 5 is a block diagram of a wireless access point (AP) in accordance with example embodiments.

FIG. 5 shows an example AP 500 that may be one embodiment of the AP 310 of FIG. 3. AP 500 may include a PHY device 510 including at least a number of transceivers 511 and a baseband processor 512, may include a MAC 520 including at least a number of contention engines 521 and frame formatting circuitry 522, may include a processor 530, may include a memory 540, may include a network interface 550, and may include a number of antennas 560(1)-560(n). The transceivers 511 may be coupled to antennas 560(1)-560(n), either directly or through an antenna selection circuit (not shown for simplicity). The transceivers 511 may be used to communicate wirelessly with one or more STAs, with one or more other APs, and/or with other suitable devices. Although not shown in FIG. 5 for simplicity, the transceivers 511 may include any number of transmit chains to process and transmit signals to other wireless devices via antennas 560(1)-560(n), and may include any number of receive chains to process signals received from antennas 560(1)-560(n). Thus, for example embodiments, the AP 500 may be configured for MIMO operations including, for example, SU-MIMO operations and MU-MIMO operations.

The baseband processor 512 may be used to process signals received from processor 530 and/or memory 540 and to forward the processed signals to transceivers 511 for transmission via one or more of antennas 560(1)-560(n), and may be used to process signals received from one or more of antennas 560(1)-560(n) via transceivers 511 and to forward the processed signals to processor 530 and/or memory 540.

The network interface 550 may be used to communicate with a WLAN server (not shown for simplicity) either directly or via one or more intervening networks and to transmit signals.

For purposes of discussion herein, MAC 520 is shown in FIG. 5 as being coupled between PHY device 510 and processor 530. For actual embodiments, PHY device 510, MAC 520, processor 530, memory 540, and/or network interface 550 may be connected together using one or more buses (not shown for simplicity).

The contention engines 521 may contend for access to the shared wireless medium, and may also store packets for transmission over the shared wireless medium. For some embodiments, AP 500 may include one or more contention engines 521 for each of a plurality of different access categories. For other embodiments, the contention engines 521 may be separate from MAC 520. For still other embodiments, the contention engines 521 may be implemented as one or more software modules (e.g., stored in memory 540 or within memory provided within MAC 520) containing instructions that, when executed by processor 530, perform the functions of contention engines 521.

The frame formatting circuitry 522 may be used to create and/or format frames received from processor 530 and/or memory 540 (e.g., by adding MAC headers to PDUs provided by processor 530), and may be used to re-format frames received from PHY device 510 (e.g., by stripping MAC headers from frames received from PHY device 510).

Memory 540 may include a STA profile data store 541 that stores profile information for a plurality of STAs. The profile information for a particular STA may include information including, for example, its MAC address, previous ranging operations, supported data rates, connection history with AP 500, and any other suitable information pertaining to or describing the operation of the STA.

Figure 9:
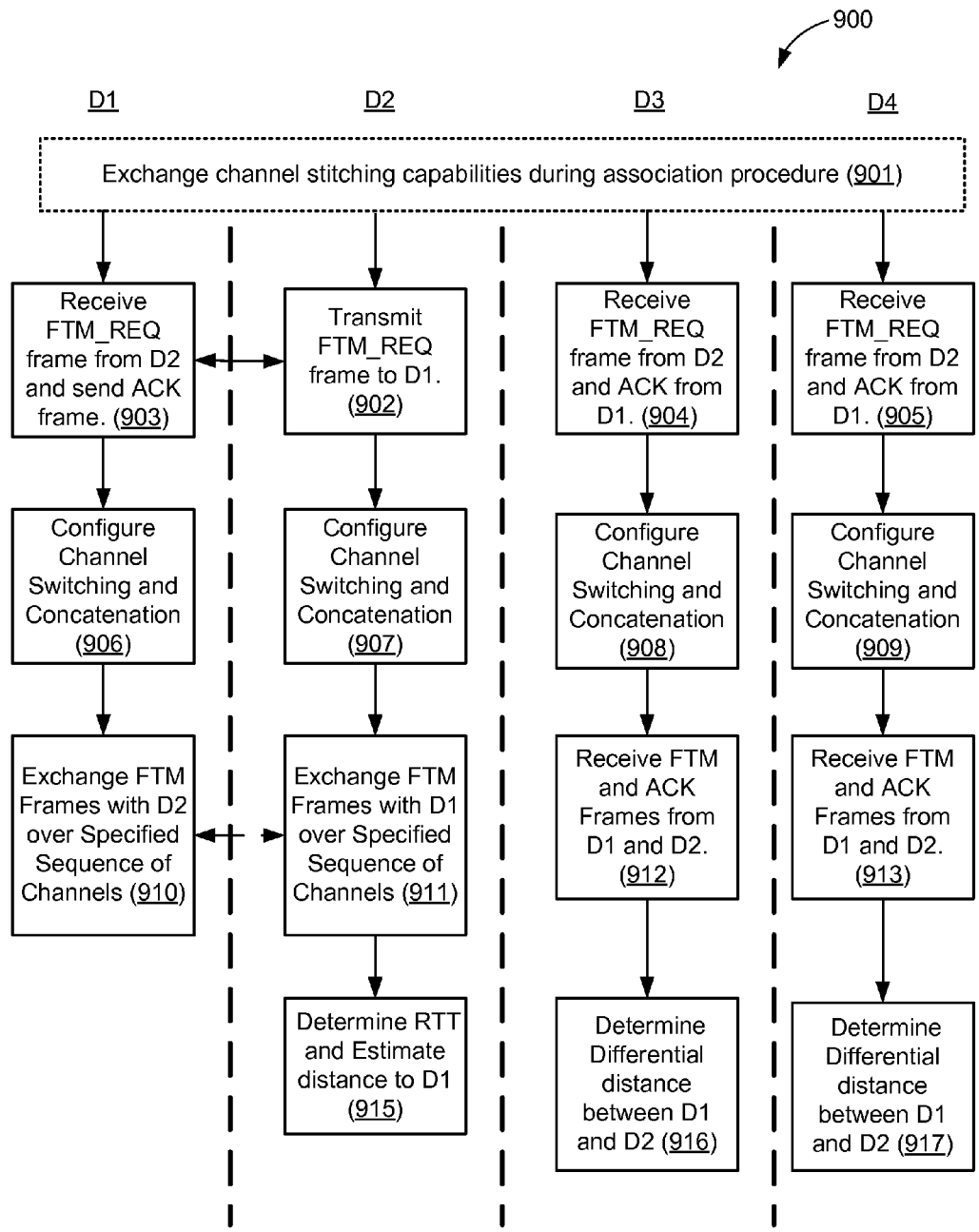
FIG. 9 shows another illustrative flowchart depicting the passive ranging operation of FIG. 6 in accordance with example embodiments.

Memory 540 may also include a non-transitory computer-readable medium (e.g., one or more nonvolatile memory elements, such as EPROM, EEPROM, Flash memory, a hard drive, and so on) that may store at least the following software (SW) modules:

- a frame formatting and exchange software module 542 to facilitate the creation and exchange of any suitable frames (e.g., data frames, control frame, and management frames) between AP 500 and other wireless devices (e.g., as described for one or more operations of FIGS. 6, 8, and 9);
- a ranging SW module 543 to determine RTT values, the distance between the AP 500 and one or more other devices, and/or a differential distance between the AP 500 and a pair of other ranging devices (e.g., as described herein for one or more operations of FIGS. 6, 8, and 9);
- a positioning SW module 544 to determine the location of the AP 500 based on the distances (or differential distances) determined by the ranging module 543 and/or based on the locations of other wireless devices (e.g., as described herein for one or more operations of FIGS. 6, 8, and 9);
- a timestamp SW module 545 to capture timestamps (e.g., TOA and/or TOD information) of frames received by AP 500 (e.g., as described herein for one or more operations of FIGS. 6, 8, and 9);
- a channel concatenation SW module 546 to combine or stitch together channel information from a number of different wireless channels to generate a wide-band channel estimation (e.g., as described herein for one or more operations of FIGS. 6, 8, and 9); and
- a channel scheduling SW module 547 to coordinate channel selection and/or switching operations with a number of other ranging devices (e.g., as described herein for one or more operations of FIGS. 6, 8, and 9).

Each software module includes instructions that, when executed by processor 530, cause AP 500 to perform the corresponding functions. The non-transitory computer-readable medium of memory 540 thus includes instructions for performing all or a portion of the operations depicted in FIGS. 6 and 8.

Processor 530 may be any suitable one or more processors capable of executing scripts or instructions of one or more software programs stored in AP 500 (e.g., within memory 540). For example, processor 530 may execute the frame formatting and exchange software module 542 to facilitate the creation and exchange of any suitable frames (e.g., data frames, control frame, and management frames) between AP 500 and other wireless devices. Processor 530 may execute the ranging SW module 543 to determine RTT values, the distance between the AP 500 and one or more other devices, and/or a differential distance between the AP 500 and a pair of other ranging devices. Processor 530 may execute the positioning SW module 544 to determine the location of the AP 500 based on the distances (or differential distances) determined by the ranging module 543 and/or based on the locations of other wireless devices. Processor 530 may execute the timestamp SW module 545 to capture timestamps (e.g., TOA and/or TOD information) of frames received by AP 500. Processor 530 may execute the channel concatenation SW module 546 to combine or stitch together channel information from a number of different wireless channels to generate a wider bandwidth channel estimation. Processor 530 may execute the channel scheduling SW module 547 to coordinate channel selection and/or switching operations with a number of other ranging devices.

FIG. 6 depicts an example ranging operation 601 that may be performed by listening to a plurality of FTM frame exchanges between a pair of active ranging devices over a number of different wireless channels, in accordance with example embodiments. For the example of FIG. 6, devices D1 and D2 are active ranging devices, and device D3 is a passive listening device. Further, device D2 is depicted as requesting the active ranging operation, and thus device D2 is the initiator device and device D1 is the responder device. As shown in FIG. 6, the distance between device D1 and device D2 is denoted as "d12," the distance between device D1 and device D3 is denoted as "d13," and the distance between device D2 and device D3 is denoted as "d23."

Device D2 requests a multi-channel ranging operation with device D1 by transmitting an FTM_REQ frame to device D1. The FTM_REQ frame, which is transmitted on a first wireless channel (CH_a), may include channel selection and/or channel switching information. The channel selection information may indicate upon which of the number of different wireless channels each of a plurality of subsequent FTM frame exchanges between devices D1 and D2 are to occur. The channel switching information may indicate specific times at which each of devices D1-D3 is to switch between wireless channels (e.g., when to switch from the current wireless channel to a next wireless channel). For at least some embodiments, the specific channel switching times may be based on (or referenced to) each device's TSF value. For other embodiments, other time references may be used to synchronize channel switching operations between devices D1-D3.

Device D1 responds to the FTM_REQ frame by transmitting an ACK frame to device D2 on the first wireless channel (CH_a). The ACK frame may acknowledge the requested multi-channel ranging operation.

At time ta1, a first FTM frame exchange begins when device D1 transmits a first FTM frame (FTM_1) to device D2 on the first wireless channel (CH_a). Device D1 captures the TOD of FTM_1 as time ta1. In response thereto, device D2 transmits a first ACK frame (ACK1) on the first wireless channel at time ta3, and captures the TOD of ACK1 as time ta3. Device D1 receives ACK1 at time ta4, and captures the TOA of ACK1 as time ta4.

At time ta5, each of devices D1-D3 switches operation from the first wireless channel (CH_a) to a second wireless channel (CH_b). For some implementations, the first wireless channel and the second wireless channel may occupy adjacent frequency ranges. For other implementations, the first wireless channel and the second wireless channel may occupy overlapping frequency ranges or may occupy non-adjacent frequency ranges.

At time tb1, a second FTM frame exchange begins when device D1 transmits a second FTM frame (FTM_2) to device D2 on the second wireless channel (CH_b). Device D1 captures the TOD of FTM_2 as time tb1. FTM_2 includes the timestamps captured at times ta1 and ta4 (e.g., the TOD of FTM_1 from device D1 and the TOA of ACK1 at device D1). Device D2 receives FTM_2 at time tb2, and may capture FTM_2's TOA timestamp as time tb2. In response thereto, device D2 transmits a second ACK frame (ACK2) on the second wireless channel at time tb3, and captures the TOD of ACK2 as time tb3. Device D1 receives ACK2 at time tb4, and captures the TOA of ACK2 as time tb4.

At time tb5, each of devices D1-D3 switches operation from the second wireless channel (CH_b) to a third wireless channel (CH_c). For some implementations, the second wireless channel and the third wireless channel may occupy adjacent frequency ranges. For other implementations, the second wireless channel and the third wireless channel may occupy overlapping frequency ranges or may occupy non-adjacent frequency ranges.

At time tc1, a third FTM frame exchange begins when device D1 transmits a third FTM frame (FTM_3) to device D2 on the third wireless channel (CH_c). Device D1 captures the TOD of FTM_3 as time tc1. FTM_3 includes the timestamps captured at times tb1 and tb4 (e.g., the TOD of FTM_2 from device D1 and the TOA of ACK2 at device D1). Device D2 receives FTM_3 at time tc2, and may capture FTM_3's TOA timestamp as time tc2. In response thereto, device D2 transmits a third ACK frame (ACK3) on the third wireless channel at time tc3, and captures the TOD of ACK3 as time tc3. Device D1 receives ACK3 at time tc4, and captures the TOA of ACK3 as time tc4.

At time tc5, each of devices D1-D3 switches operation from the third wireless channel (CH_c) to a fourth wireless channel (CH_d). For some implementations, the third wireless channel and the fourth wireless channel may occupy adjacent frequency ranges. For other implementations, the third wireless channel and the fourth wireless channel may occupy overlapping frequency ranges or may occupy non-adjacent frequency ranges.

At time td1, a fourth FTM frame exchange begins when device D1 transmits a fourth FTM frame (FTM_4) to device D2 on the fourth wireless channel (CH_d). Device D1 captures the TOD of FTM_4 as time td1. FTM_4 includes the timestamps captured at times tc1 and tc4 (e.g., the TOD of FTM_3 from device D1 and the TOA of ACK3 at device D1). Device D2 receives FTM_4 at time td2, and may capture FTM_4's TOA timestamp as time td2. In response thereto, device D2 transmits a fourth ACK frame (ACK4) on the fourth wireless channel at time td3, and captures the TOD of ACK4 as time td3. Device D1 receives ACK4 at time td4, and captures the TOA of ACK4 as time td4.

This process may continue for any number of subsequent FTM frame exchanges on a corresponding number of different wireless channels. Thus, although only 4 FTM frame exchanges are depicted in the example of FIG. 6, the example embodiments may perform any suitable number of FTM frame exchanges on any suitable number of wireless channels.

As the passive listening device, device D3 may receive all of the frames exchanged during the active ranging operation(s) between device D1 and device D2. For example, device D3 may receive the FTM_REQ and ACK frames on the first wireless channel (CH_a). As mentioned above, the FTM_REQ frame may include channel selection information indicating the wireless channels upon which subsequent FTM frame exchanges between devices D1 and D2 are to occur, and may include channel switching information indicating specific times at which device D3 is to switch between wireless channels (e.g., times ta5, tb5, tc5, and so on). For purposes of discussion herein, the channel selection information and the channel switching information may hereinafter be collectively referred to as the channel switching information.

In response to the FTM_REQ frame, device D3 may stay on the first wireless channel and receive FTM_1 and ACK1 at times tpa1 and tpa2, respectively. Then, at time ta5, device D3 switches from the first wireless channel to the second wireless channel. Device D3 may receive FTM_2 and ACK2 at times tpb1 and tpb2, respectively, on the second wireless channel. Device D3 may extract the timestamps ta1 and ta4

(e.g., indicating the TOD of FTM_1 from device D1 and the TOA of ACK1 at device D1) from FTM_2. Device D3 may then use times tpa1, tpa2, ta1, and ta4 to determine a differential distance between itself and devices D1 and D2 on the first wireless channel. For example, device D3 may determine, for the first wireless channel, a propagation time of FTM_1 from device D1 to device D3 as $T_{1,3}$=tpa1−ta1, and may determine a propagation time of ACK1 from device D2 to device D3 as $T_{2,3}$=tpa2−ta3. The propagation time $T_{1,3}$ may be used to determine the distance d13 between devices D1 and D3, and the propagation time $T_{2,3}$ may be used to determine the distance d23 between devices D2 and D3. The differential distance between device D3 and each of devices D1 and D2 may be expressed as $d_{diff}$=d13−d23.

Next, at time tb5, device D3 switches from the second wireless channel to the third wireless channel. Device D3 may receive FTM_3 and ACK3 at times tpc1 and tpc2, respectively, on the third wireless channel. Device D3 may extract the timestamps tb1 and tb4 (e.g., indicating the TOD of FTM_2 from device D1 and the TOA of ACK2 at device D1) from FTM_3. Device D3 may then use times tpb1, tpb2, tb1, and tb4 to determine a differential distance between itself and devices D1 and D2 on the second wireless channel. For example, device D3 may determine, for the second wireless channel, a propagation time of FTM_2 from device D1 to device D3 as $T_{1,3}$=tpb1−tb1, and may determine a propagation time of ACK2 from device D2 to device D3 as $T_{2,3}$=tpb2−tb3. As mentioned above, the differential distance between device D3 and each of devices D1 and D2 may be expressed as $d_{aft}$=d13−d23.

Then, at time tc5, device D3 switches from the third wireless channel to the fourth wireless channel. Device D3 may receive FTM_4 and ACK4 at times tpd1 and tpd2, respectively, on the fourth wireless channel. Device D3 may extract the timestamps tc1 and tc4 (e.g., indicating the TOD of FTM_3 from device D1 and the TOA of ACK3 at device D1) from FTM_4. Device D3 may then use times tpc1, tpc2, tc1, and tc4 to determine a differential distance between itself and devices D1 and D2 on the third wireless channel. For example, device D3 may determine, for the third wireless channel, a propagation time of FTM_3 from device D1 to device D3 as $T_{1,3}$=tpc1−tc1, and may determine a propagation time of ACK3 from device D2 to device D3 as $T_{2,3}$=tpc2−tc3. As mentioned above, the differential distance between device D3 and each of devices D1 and D2 may be expressed as $d_{aft}$=d13−d23.

By exchanging FTM frames over a plurality of different wireless channels (e.g., 4 different wireless channels for the example of FIG. 6), each of devices D1-D3 may obtain channel information (e.g., channel conditions or channel state information (CSI)) for each of the different wireless channels. Then, each of devices D1-D3 may employ a suitable channel stitching operation to determine channel conditions for all of the frequency ranges occupied by the plurality of different wireless channels, thereby allowing each of devices D1-D3 to obtain a wider bandwidth channel estimation than would be possible if the FTM frame exchanges occurred over a single channel (e.g., as depicted in the example ranging operation 201 of FIG. 2). For example, if each of the wireless channels CH_a, CH_b, CH_c, and CH_d has a bandwidth of 80 MHz, then the example ranging operation 601 depicted in FIG. 6 may allow for channel estimation of up to 4*80=320 MHz (assuming that the frequency ranges occupied by the wireless channels CH_a, CH_b, CH_c, and CH_d are non-overlapping). In this manner, the example embodiments may allow device D3 to achieve greater timing accuracy than single-channel passive ranging operations without sacrificing SNR or range. For at least some embodiments, the channel stitching operation may be used to adjust or modify RTT values, the distances, and/or the differential distances determined by one or more of devices D1-D3.

Thereafter, device D3 may use well-known hyperbolic navigation techniques to determine its location based on differential distances between itself and three or more pairs of active ranging devices. Because device D3 does not transmit any frames during the passive ranging operation 601 depicted in FIG. 6, device D3 may determine its location using less power, for example, compared with active ranging devices such as devices D1 and D2.

The example ranging operation 601 depicted in FIG. 6 may be applicable to and/or performed by any suitable number of passive listening devices. For example, a number of other passive listening devices (e.g., devices D4-Dn, not shown for simplicity) that are within wireless range of devices D1 and D2 may also receive the FTM frame exchanges between devices D1 and D2, and may each perform passive ranging operations in the manner described above with respect to FIG. 6.

For at least some embodiments, after devices D1 and D2 complete a plurality of FTM frame exchanges on a number of different wireless channels, device D1 may become the passive listening device, and devices D2 and D3 may perform an active ranging operation by exchanging a plurality FTM and ACK frames on a number of different wireless channels (e.g., in the manner described above with respect to FIG. 6). For one example, device D2 may be the initiator device, device D3 may be the responder device, and device D1 may be the passive listening device. For another example, device D3 may be the initiator device, device D1 may be the responder device, and device D2 may be the passive listening device.

As mentioned above, to perform sequential ranging operations over a number of different wireless channels, the active ranging devices (as well as the passive listening device) may exchange channel switching information to synchronize channel switching operations. The channel switching information may include times at which the devices are to switch to a given wireless channel. For at least some embodiments, the channel switching information may include a channel switching schedule that indicates times at which the ranging devices are to switch to designated channels. Either of the devices involved in the exchange of FTM frames may alert other nearby devices of the channel switching schedule.

As mentioned above, the initiator device (e.g., device D2 of FIG. 6) may inform other devices of its intent to initiate a multi-channel ranging operation by embedded a ranging request in the FTM_REQ frame. For one implementation, bit 7 of the trigger field of the FTM_REQ frame may be set (e.g., asserted to logic high) to request the multi-channel ranging operation and/or to request a corresponding channel stitching operation. In response thereto, the responder device D1 may send channel switching information to device D2 (and other devices within wireless range of device D1). For other implementations, the initiator device D2 may send channel switching information to device D1 (and other devices within wireless range of device D2).

Figure 7:
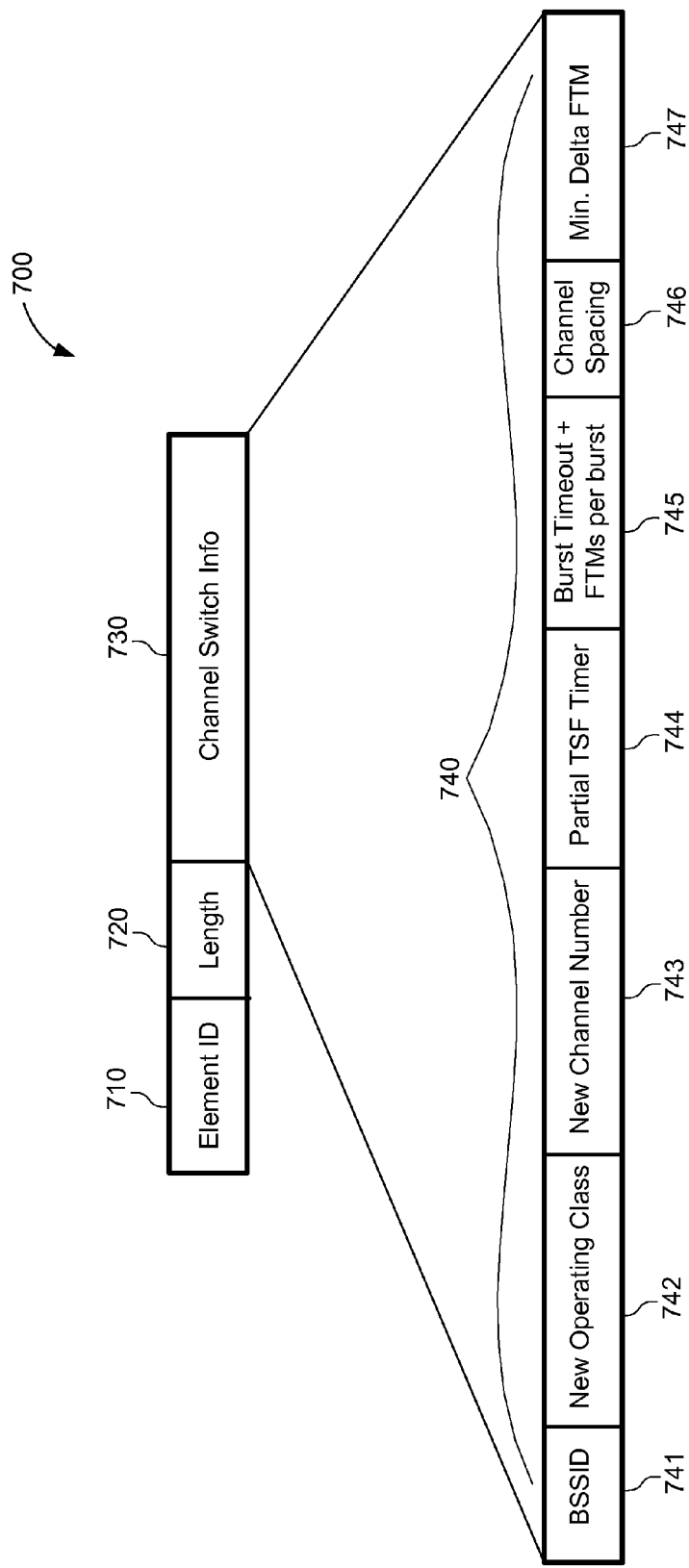
FIG. 7 depicts an example frame format for a channel switching information element in accordance with example embodiments.

For some embodiments, a new information element (IE) may be defined to report channel switching information to nearby ranging devices. For example, FIG. 7 shows an example channel switching IE 700 that may be included in a control frame and/or a management frame (or any other suitable frame) to report channel switching information to nearby ranging devices. For other embodiments, the channel switching IE 700 may be a vendor-specific information element (VSIE).

The example channel switching IE 700 may include a one-byte Element ID field 710, a one-byte Length field 720, and a variable length Channel Switch Information field 730 (although for other embodiments, each of fields 710, 720, and 730 may be of any suitable length). The Element ID field 710 may store a value to indicate that the corresponding IE is a channel switching IE 700.

The length field 720 may store a value indicating a length of the channel switching IE 700. For at least some embodiments, the length field 720 may store a value equal 2+N×13 or 2+N×10, where N is the number of the initiator devices with which the responder device wishes to exchange FTM frames (e.g., during multi-channel ranging operations).

The channel switching information field 730 may include a number N of per-STA information fields 740 (only one per-STA information field 740 is shown in FIG. 7 for simplicity). For some implementations, each of the per-STA information fields 740 may include at least the following sub-fields:

a BSSID sub-field 741 that may indicate the BSSID of the $n^{th}$ initiator device;

a New Operating Class sub-field 742 that may indicate the channel set of the responder device;

a New Channel Number sub-field 743 that may indicate the primary channel of the responder device; and a Partial TSF Timer sub-field 744 that may indicate a partial value of the responder device's TSF timer at the start of the first burst instance of an FTM session. For some implementations, the partial TSF timer value may be derived by removing the X most significant bits and the Y least significant bits from the 64-bit TSF timer value, where X and Y are integers greater than 1. For example, in at least one implementation, the partial TSF timer value may be derived by removing the 38 most significant bits and the 10 least significant bits from the 64-bit TSF timer. For other implementations, other portions (or the entirety) of the device's TSF timer value may be stored in the Partial TSF Timer sub-field 744.

The New Operating Class sub-field 742 and the New Channel Number sub-field 743 may, for at least some embodiments, indicate the sequence of channels upon which corresponding FTM frame exchanges are to be performed and/or channel switching times.

In addition, for some embodiments, the per-STA information field 740 may also include the following sub-fields:

a Burst Timeout sub-field 745 that may indicate a burst timeout value for FTM frames exchanges;

a Channel Spacing/Format sub-field 746 that may indicate the channel frequencies and/or channel spacing information; and a Minimum Delta FTM sub-field 747 that may indicate a minimum difference value between transmission of FTM frames.

Referring also to FIG. 6, for implementations in which device D1 is an AP in a WLAN or device D1 is a group owner of a P2P network (or any suitable device that manages or otherwise coordinates transmission activities of other devices), device D1 may embed the channel switching IE 700 in beacon frames, which as mentioned above may be periodically transmitted to nearby devices (e.g., according to a TBTT schedule). For other implementations, device D2 may embed the channel switching IE 700 into the FTM_REQ frame (or any other suitable frame).

FIG. 8 is an illustrative flow chart depicting an example passive ranging operation 800 performed by a passive listening device. For the example ranging operation 800 depicted in FIG. 8, the passive listening device may be device D3 of FIG. 6, the first wireless device may be device D1 of FIG. 6, and the second wireless device may be device D2 of FIG. 6. Further, for some embodiments, the first wireless device of FIG. 8 may be an AP (e.g., AP 500 of FIG. 5), and the second wireless device and the passive listening device may be stations (e.g., STA 400 of FIG. 4).

First, the passive listening device may receive, on a first wireless channel, channel switching information indicating a time at which the passive listening device, a first wireless device, and a second wireless device are to switch from the first wireless channel to a second wireless channel (802). The channel switching information may also indicate frequencies of the first and second wireless channels. In some aspects, the channel switching information may be embedded within a frame received by the passive listening device. The frame may be a beacon frame transmitted from the first wireless device, or may be an FTM frame transmitted from the second wireless device.

Then, the passive listening device may receive, on the first wireless channel, a first exchange of signals between the first wireless device and the second wireless device (804). Next, the passive listening device may receive, on the second wireless channel, a second exchange of signals between the first wireless device and the second wireless device (806).

Then, the passive listening device may determine a differential distance between the passive listening device and the first and second wireless devices based, at least in part, on the first and second exchanges of signals on the first and second wireless channels, respectively (808). For at least some embodiments, the passive listening device may determine channel conditions of the first wireless channel and the second wireless channel based, at least in part, on the first exchange of signals and the second exchange of signals, respectively (808A), may estimate channel conditions for a wide-band frequency range that includes frequency bandwidths associated with the first and second wireless channels based, at least in part, on the determined channel conditions for the first and second wireless channels (808B), and may modify the determined differential distance based, at least in part, on the estimated channel conditions for the wide-band frequency range (808C).

FIG. 9 is an illustrative flow chart depicting an example passive ranging operation 900 performed among devices D1, D2, D3, and D4 in accordance with some embodiments. Devices D1-D4 may be any suitable Wi-Fi enabled devices including, for example, a mobile device (e.g., a smartphone or tablet computer) or a stationary device (e.g., a wireless access point or other ranging device). For purposes of discussion herein, device D2 is the initiator device, device D1 is the responder device, and devices D3 and D4 are passive listening devices. For at least some embodiments, devices D1-D4 may each be one of AP 500 of FIG. 5 or stations STA1-STA4 of FIG. 4.

Referring also to FIG. 6, the devices D1-D4 may, for some embodiments, exchange channel stitching capabilities during an association procedure (901). The exchange of channel stitching capabilities may cause device D1 to respond to FTM_REQ frames sent by device D2 with frames containing channel switching IE 700 of FIG. 7, for example, to indicate channel switching information (and other preferences) for the ranging operation 900 of FIG. 9.

The ranging operation 900 of FIG. 9 may begin with device D2 creating an FTM_REQ frame. For some embodiments, the FTM_REQ frame may include a request for a multi-channel ranging operation and a corresponding channel stitching operation. Device D2 then transmits the FTM_REQ frame to device D1 (902). Device D1 responds to the FTM_REQ frame by transmitting an ACK frame to device D2 (903). Passive listening devices D3 and D4 also receive the FTM_REQ and ACK frames (904 and 905, respectively).

Once the FTM_REQ frame is transmitted and acknowledged, devices D1 through D4 configure channel switching and channel concatenation preferences (906, 907, 908, and 909, respectively). In some embodiments, these preferences are transmitted with the FTM Request frame, while in other embodiments these preferences are not transmitted until device D1 transmits an FTM frame (e.g. at time ta1 in FIG. 6). If channel switching and concatenation preferences are transmitted by device D1, then steps 906-909 may be conducted in parallel with subsequent steps.

Once the FTM Request frame is transmitted and acknowledged, and channel switching and concatenation preferences are configured, devices D1 and D2 exchange FTM frames over multiple channels, for example, in an operation similar to that depicted in FIG. 6 (910 and 911, respectively). Passive listening devices D3 and D4 also receive these exchanged FTM frames, for example, in an operation similar to that depicted in FIG. 6 (912 and 913, respectively).

After devices D1 and D2 have completed their exchange of FTM and ACK frames, device D2 may determine RTT values and estimate its distance to device D1 (915). Devices D3 and D4 may determine differential distances to devices D1 and D2 (916 and 917). Although not shown for simplicity, in some embodiments, after ranging operations between device D1 and device D2 are performed, similar operations may be performed between other pairs of devices. For example, device D1 may embed channel switching IE 700 in the first FTM frame. The channel switching IE 700 element may contain multiple Per-STA fields 740 indicating multiple devices with which device D1 seeks to exchange FTM frames. After completing the operations depicted in FIG. 9, multiple listening devices may listen to FTM frame exchanges between a number of pairs of ranging devices.

For example, in a system including six devices D1-D6, suppose that devices D1, D2, D5, and D6 have known locations, and that devices D3 and D4 have unknown locations. For at least one embodiment, devices D3 and D4 may listen to FTM frame exchanges between devices D1 and D2, may listen to FTM frame exchanges between devices D1 and D5, and may listen to FTM frame exchanges between devices D1 and D6. Then, devices D3 and D4 may determine their locations based on the three determined differential distances.

Figure 10:
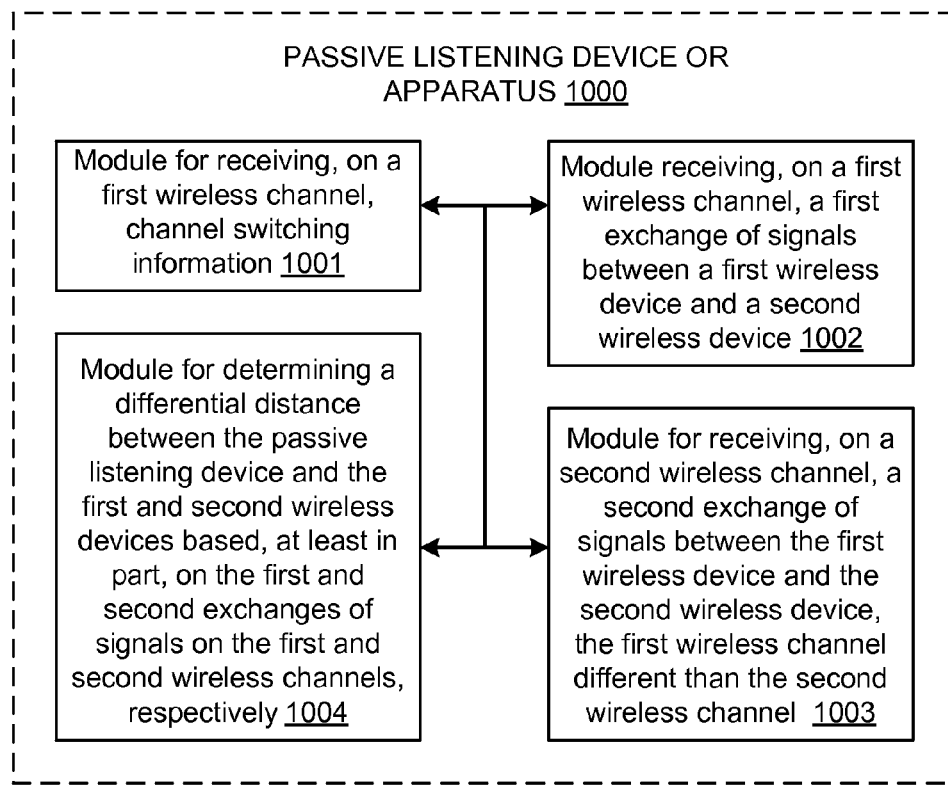
FIG. 10 is another block diagram of several sample aspects of apparatuses configured to perform multi-channel passive ranging operations as taught herein.

FIG. 10 shows an example passive listening device or apparatus 1000 represented as a series of interrelated functional modules. A module 1001 for receiving, on a first wireless channel, channel switching information indicating a time at which the passive listening device 1000, a first wireless device, and a second wireless device are to switch from the first wireless channel to the second wireless channel may correspond at least in some aspects to, for example, a processor as discussed herein (e.g., processor 430 of FIG. 4 and/or processor 530 of FIG. 5). A module 1002 for receiving, on a first wireless channel, a first exchange of signals between a first wireless device and a second wireless device may correspond at least in some aspects to, for example, a processor as discussed herein (e.g., processor 430 of FIG. 4 and/or processor 530 of FIG. 5). A module 1003 for receiving, on a second wireless channel, a second exchange of signals between the first wireless device and the second wireless device, the first wireless channel different than the second wireless channel may correspond at least in some aspects to, for example, a processor as discussed herein (e.g., processor 430 of FIG. 4 and/or processor 530 of FIG. 5). A module 1004 for determining a differential distance between the passive listening device and the first and second wireless devices based, at least in part, on the first and second exchanges of signals on the first and second wireless channels, respectively may correspond at least in some aspects to, for example, a processor as discussed herein (e.g., processor 430 of FIG. 4 and/or processor 530 of FIG. 5).

The functionality of the modules of FIG. 10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 10, as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for performing a passive ranging operation, the method performed by a passive listening device and comprising:
   receiving, on a first wireless channel, a first exchange of signals between a first wireless device and a second wireless device;
   receiving, on a second wireless channel, a second exchange of signals between the first wireless device and the second wireless device, the first wireless channel different than the second wireless channel; and
   determining a differential distance between the passive listening device and the first and second wireless devices based, at least in part, on the first and second exchanges of signals on the first and second wireless channels, respectively, wherein determining the differential distance comprises:
      determining channel conditions of the first wireless channel and the second wireless channel based, at least in part, on the first exchange of signals and the second exchange of signals, respectively; and
      estimating channel conditions for a wide-band frequency range that includes frequency bandwidths associated with the first and second wireless channels based, at least in part, on the determined channel conditions for the first and second wireless channels;
      wherein the differential distance is determined based, at least in part, on the estimated channel conditions for the wide-band frequency range.

2. The method of claim 1, the first exchange of signals comprising a first active ranging operation between the first and second wireless devices, and the second exchange of signals comprising a second active ranging operation between the first and second wireless devices.

3. The method of claim 1, the estimating further comprising:
   combining the determined channel conditions for the first and second wireless channels by performing a channel stitching operation on the first and second wireless channels.

4. The method of claim 1, further comprising:
   receiving, on the first wireless channel, channel switching information indicating a time at which the passive listening device, the first wireless device, and the second wireless device are to switch from the first wireless channel to the second wireless channel.

5. The method of claim 4, the channel switching information indicating frequencies of the first and second wireless channels.

6. The method of claim 4, the channel switching information contained in an information element embedded within a frame received by the passive listening device.

7. The method of claim 6, the information element including at least a partial timing synchronization function (TSF) value indicating the time.

8. The method of claim 6, the frame comprising a beacon frame received from the first wireless device.

9. The method of claim 6, the frame comprising a fine timing measurement (FTM) request frame received from the second wireless device.

10. A passive listening device configured to perform a passive ranging operation, the passive listening device comprising:
    one or more processors; and
    a memory configured to store instructions that, when executed by the one or more processors, cause the passive listening device to:
       receive, on a first wireless channel, a first exchange of signals between a first wireless device and a second wireless device;
       receive, on a second wireless channel, a second exchange of signals between the first wireless device and the second wireless device, the first wireless channel different than the second wireless channel;
       determine channel conditions of the first wireless channel and the second wireless channel based, at least in part, on the first exchange of signals and the second exchange of signals, respectively;
       estimate channel conditions for a wide-band frequency range that includes frequency bandwidths associated with the first and second wireless channels based, at least in part, on the determined channel conditions for the first and second wireless channels; and
       determine a differential distance between the passive listening device and the first and second wireless devices based, at least in part, on the first and second exchanges of signals on the first and second wireless channels, respectively,
       wherein the differential distance is determined based, at least in part, on the estimated channel conditions for the wide-band frequency range.

11. The passive listening device of claim 10, wherein execution of the instructions to estimate channel conditions causes the passive listening device to further:
    combine the determined channel conditions for the first and second wireless channels by performing a channel stitching operation on the first and second wireless channels.

12. The passive listening device of claim 10, wherein execution of the instructions causes the passive listening device to further:
   receive, on the first wireless channel, channel switching information indicating a time at which the passive listening device, the first wireless device, and the second wireless device are to switch from the first wireless channel to the second wireless channel.

13. The passive listening device of claim 12, the channel switching information indicating frequencies of the first and second wireless channels.

14. The passive listening device of claim 12, the channel switching information contained in an information element embedded within a beacon frame received from the first wireless device.

15. The passive listening device of claim 14, the information element including at least a partial timing synchronization function (TSF) value indicating the time.

16. A non-transitory computer-readable storage medium storing one or more programs containing instructions that, when executed by one or more processors of a passive listening device, cause the passive listening device to perform a passive ranging operation by performing operations comprising:
   receiving, on a first wireless channel, a first exchange of signals between a first wireless device and a second wireless device;
   receiving, on a second wireless channel, a second exchange of signals between the first wireless device and the second wireless device, the first wireless channel different than the second wireless channel;
   determining channel conditions of the first wireless channel and the second wireless channel based, at least in part, on the first exchange of signals and the second exchange of signals, respectively;
   estimating channel conditions for a wide-band frequency range that includes frequency bandwidths associated with the first and second wireless channels based, at least in part, on the determined channel conditions for the first and second wireless channels; and
   determining a differential distance between the passive listening device and the first and second wireless devices based, at least in part, on the first and second exchanges of signals on the first and second wireless channels, respectively,
   wherein the differential distance is determined based, at least in part, on the estimated channel conditions for the wide-band frequency range.

17. The non-transitory computer-readable storage medium of claim 16, wherein execution of the instructions to estimate channel conditions causes the passive listening device to further:
   combine the determined channel conditions for the first and second wireless channels by performing a channel stitching operation on the first and second wireless channels.

18. The non-transitory computer-readable storage medium of claim 16, wherein execution of the instructions causes the passive listening device to perform operations further comprising:
   receiving, on the first wireless channel, channel switching information indicating a time at which the passive listening device, the first wireless device, and the second wireless device are to switch from the first wireless channel to the second wireless channel.

19. The non-transitory computer-readable storage medium of claim 18, the channel switching information indicating frequencies of the first and second wireless channels.

20. The non-transitory computer-readable storage medium of claim 18, the channel switching information contained in an information element embedded within a beacon frame received from the first wireless device.

21. The non-transitory computer-readable storage medium of claim 20, the information element including at least a partial timing synchronization function (TSF) value indicating the time.

22. A passive listening device configured to perform a passive ranging operation, the passive listening device comprising:
   means for receiving, on a first wireless channel, a first exchange of signals between a first wireless device and a second wireless device;
   means for receiving, on a second wireless channel, a second exchange of signals between the first wireless device and the second wireless device, the first wireless channel different than the second wireless channel; and
   means for determining a differential distance between the passive listening device and the first and second wireless devices based, at least in part, on the first and second exchanges of signals on the first and second wireless channels, respectively,
   wherein the means for determining the differential distance is to:
      determine channel conditions of the first wireless channel and the second wireless channel based, at least in part, on the first exchange of signals and the second exchange of signals, respectively; and
      estimate channel conditions for a wide-band frequency range that includes frequency bandwidths associated with the first and second wireless channels based, at least in part, on the determined channel conditions for the first and second wireless channels;
      wherein the differential distance is determined based, at least in part, on the estimated channel conditions for the wide-band frequency range.

23. The passive listening device of claim 22, the channel conditions for the wide-band frequency range estimated by combining the determined channel conditions for the first and second wireless channels by performing a channel stitching operation on the first and second wireless channels.

24. The passive listening device of claim 22, further comprising:
   means for receiving, on the first wireless channel, channel switching information indicating a time at which the passive listening device, the first wireless device, and the second wireless device are to switch from the first wireless channel to the second wireless channel.

25. The passive listening device of claim 24, the channel switching information indicating frequencies of the first and second wireless channels.

26. The passive listening device of claim 24, the channel switching information contained in an information element embedded within a beacon frame received from the first wireless device.

* * * * *